INVENTOR,
EUGENE G. BUSENBARRICK

Jan. 20, 1970 E. G. BUSENBARRICK 3,490,433

MULTI-PURPOSE PORTABLE BARBECUE

Filed Dec. 18, 1967 3 Sheets-Sheet 2

INVENTOR,
EUGENE G. BUSENBARRICK

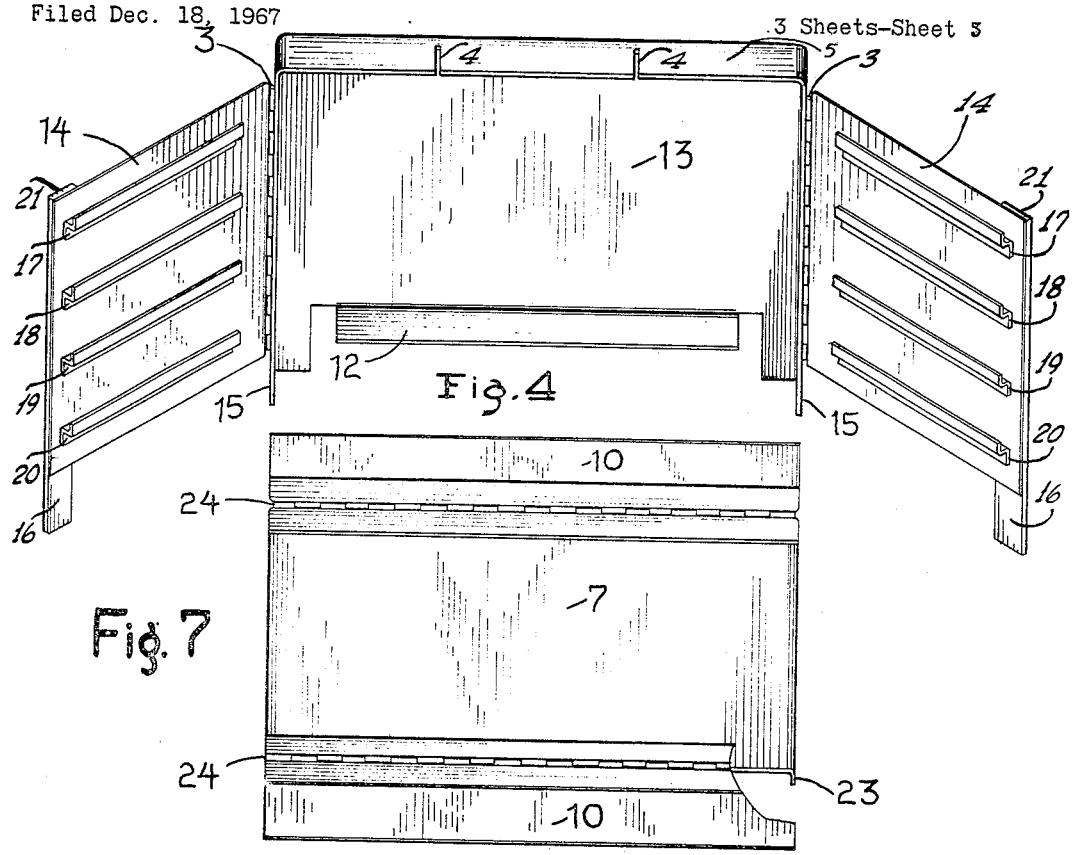

United States Patent Office 3,490,433
Patented Jan. 20, 1970

3,490,433
MULTI-PURPOSE PORTABLE BARBECUE
Eugene G. Busenbarrick, 3136 N. 37th St., Apt. 7,
Phoenix, Ariz. 85018
Filed Dec. 18, 1967, Ser. No. 691,657
Int. Cl. F24c 1/16; A47j 37/07; F24b 3/00
U.S. Cl. 126—9                                    4 Claims

ABSTRACT OF THE DISCLOSURE

An improved, portable barbecuing apparatus which, in addition to the usual fire pan and grill, is also provided with a convertible tray comprising a shelf of metal of approximately the same width and length as the fire pan, and having fullly hinged sides, movable through 270°. When placed in position below the fire pan and grill with its sides deposed in the upward position, an enclosed baking oven is formed. When placed in position above the fire pan and grill with its sides in the downward position, a roasting and/or smoking oven is formed. In inclement weather the convertible tray may be used in one of two positions above fire pan and grill to form an effective rain shield. Side walls are hinged to forwardly flanged extensions of the back wall and are provided with four pairs of equally spaced angles designed to support and lock the three functional parts in various placements and to allow for temperature control. For transporting and storing, the three detachable functional parts are placed in a space provided against the forward face of back wall, and the hinged side walls are folded and latched against them, to form a neat and compact carrying case, with the generous sized handle of the fire pan protruding through the top section of the case.

---

This invention relates to new and useful improvements in compact, portable barbecues.

One object of the invention is to provide an improved, simple, and versatile barbecue of knock-down construction, designed for ease of erection, cleaning, transporting and storing.

Another object of the invention is to provide other improvements to the existing portable barbecues which with certain manipulations, allows the baking of bread or other food, simultaneously with the barbecuing or grilling of meat.

Another object is to provide other improvements in outdoor barbecues, which allows the preparation of food in inclement weather.

Another object is to provide a simple means for roasting and/or smoking of the meat being grilled.

Other objects and features of the invention will become evident as the details of construction of the various parts and their use are fully described in the following.

Figure 1:
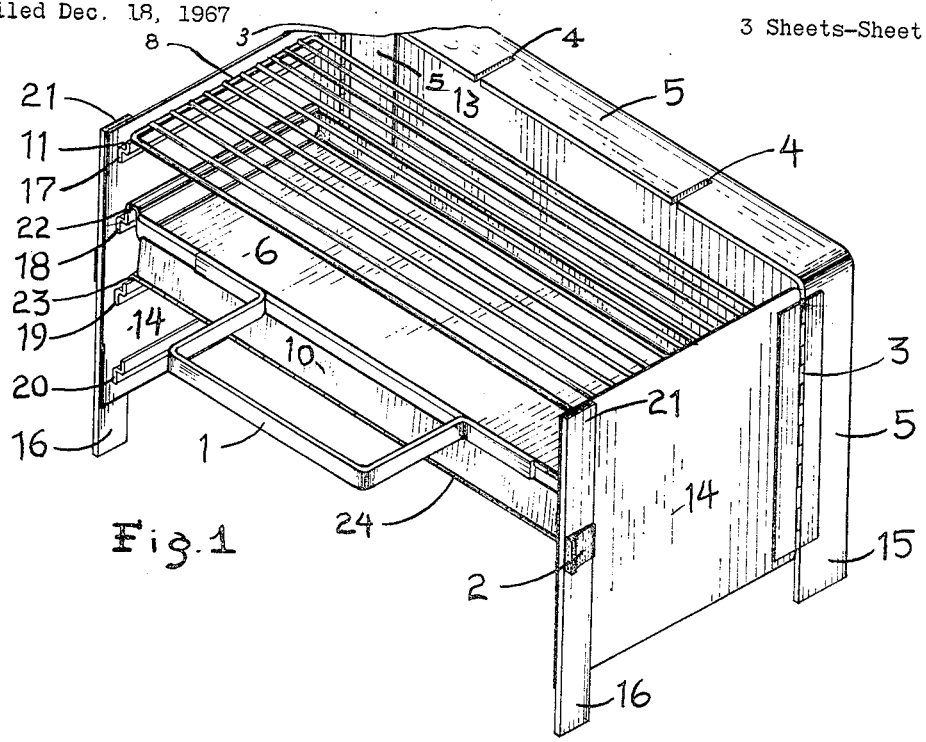
Figure 2:
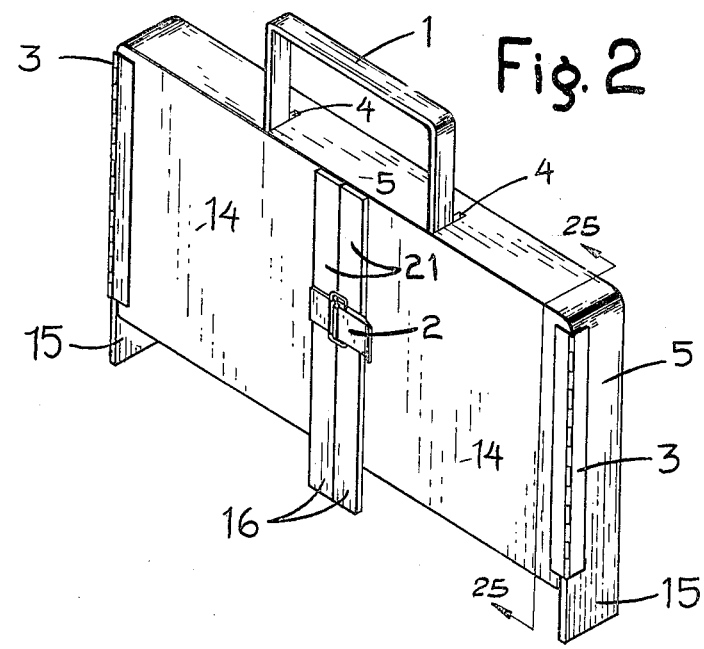
Figure 8:
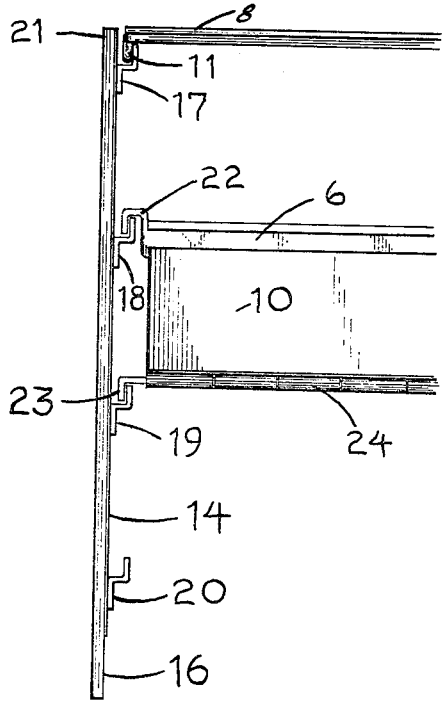
Figure 9:
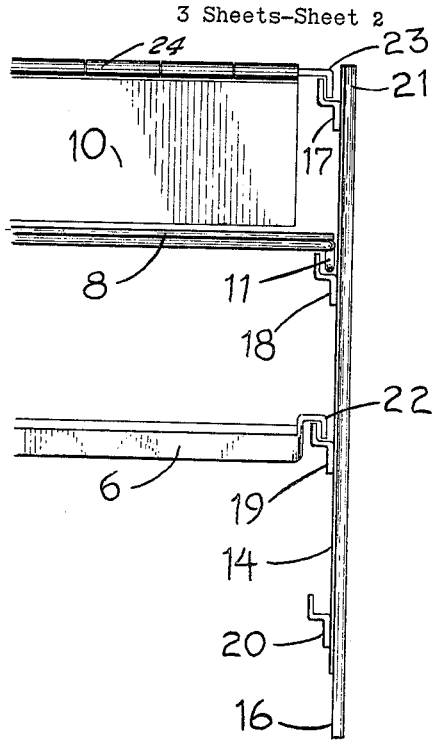
Figure 3:
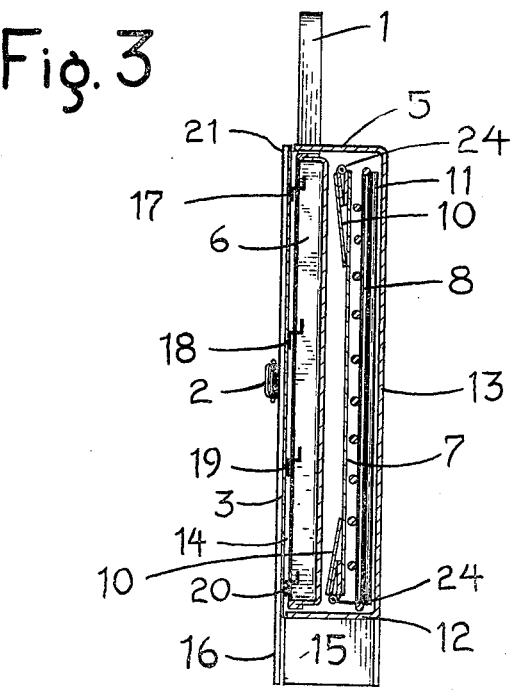

Referring to the accompanying drawings, FIGURE 1 is a perspective view of the barbecue as set up in one of its many operating positions. FIGURE 2 shows the apparatus in its compact, folded condition. FIGURE 3 presents a cross-sectional view of the folded barbecue to show all of its detached working parts as stored in its built-in carrying case. FIGURE 4 is a front view of the empty carrying case in an erect spread position. FIGURES 5 and 6 show, respectively, the fire pan and grill. FIGURE 7 is a top view of a part known as a convertible tray and shows both of its hinged sides in open position. Also shown in FIGURE 7 is one of the trays' two turned-down supporting edges. FIGURE 8 is a cut-away view of the front left hand corner of the apparatus, and illustrates the manner in which the convertible tray with its hinged sides is used below the fire pan to form a baking oven. FIGURE 9 is a cut-away view of the front right hand corner of the apparatus and illustrates the manner in which the tray may be used above the grill to form a baking and/or smoking oven.

The invention will now be described in detail beginning with its folded carrying condition as shown in FIGURE 2. A step-by-step erection procedure will be given and the various parts will be fully described, both objectively and functionally as the apparatus is set up.

Referring to FIGURE 2, the folded barbecue is grasped by handle 1, and is laid on its back side. Latch 2 is released and the two hinged doors are fully opened. Hinges 3—3 are full hinges, and extend approximately the full width of the doors. Handle 1 is again grasped and is lifted upwardly from the two slots 4—4 in the top of the carrying case. These slots are also shown in FIGURES 1 and 4. Still referring to FIGURE 2-5 is a metal strap bent as shown to form the top and two ends of the carrying case. Metal forming strap 5 carries the wieght of the folded apparatus when picked up by handle 1.

Referring now to FIGURE 3, which is a cross sectional end view of the folded apparatus taken on lines 25—25, the detached functional parts of the barbecue are shown as stored in the carrying case. Fire pan 6 is shown in an up-right position with its handle 1 protruding through the two slots, not shown, in the top of the carrying case. 7 is the convertible tray with its hinged sides 10—10 in the completely folded condition. The grill is shown at 8. It is noted that grill 8 has a small bar of metal 11 welded to one of its side support rods. The opposite side support rod, not shown, is equipped with an identical bar. The function of these metal bars is made clear by referring to FIGURES 8 and 9 where they are shown at 11—11. Referring again to FIGURE 3, 12 is a turned edge of the back panel and forms the bottom of the carrying case, as well as a support for the detached functional parts 6, 7, 8.

To proceed with the erection of the apparatus, fire pan 6 convertible tray 7 and grill 8 are now lifted from the carrying case and are set aside. The empty carrying case is placed in an erect partially open position as shown in FIGURE 4. The two hinged doors 14—14 of the carrying case now serve as side walls for the barbeque. Back wall 13, FIGURE 4 overlaps the edges and is welded to metal forming strap 5. The lower edge of back wall 13 is cut out and turned inward 90 degrees to form shelf 12, which was also referred to in the discussion of FIGURE 3. Again referring to FIGURE 4, a section of back wall 13 having the same width as metal forming strap 5 extends downward to the ground level to form a part of back legs 15—15. The forward edges of the two back legs 15—15 are extensions of forming strap 5 as shown.

The two side walls of the barbecue are equipped with four pairs of evenly spaced angled supporting channels, 17—17, 18—18, 19—19, and 20—20. In the folded condition, these supporting channels fold into fire pan 6 as shown in FIGURE 3. 16—16 in FIGURE 4 are the front legs of the apparatus and are extensions of reinforcing straps 21—21, which are welded to the forward edges of side walls 14—14. The reinforcing straps 21—21 also carry the tension latch 2, as shown in FIGURES 1, 2 and 3. Referring now to FIGURE 5, fire pan 6, which it is noted, is shallow in depth, is equipped with two U-shaped support channels 22—22.

Assuming the apparatus is to be erected in one of its normal cooking positions, as shown in FIGURE 1, the two fire pan support channels 22—22 of FIGURE 5 are slid into wall support angles 18—18 of FIGURE 4 by moving the two hinged side walls to a point where channels 22—22 fit into place. With the fire pan in place, the structure becomes rigid and the balance of the assembly is easily accomplished.

Referring now to FIGURE 7, convertible tray 7 is equipped with turned down edges, one of which is visible at 23. The turned edges interlock with any desired pair of side support angles. This is illustrated in FIGURES 8 and 9 at 23—23. Hinges 24—24 are of the full tension type and allow the sides of convertible tray to be fixed in any desired position over approximately 270 degrees of arc.

To complete the assembly shown in FIGURE 1, the two turned edges of convertible tray 7, FIGURE 7, are slid into support angles 19—19 of side panels 14—14. This places the open tray 7 directly below fire pan 6. The moveable sides 10—10 of convertible tray 7 are then moved to the upright position where the upper edges of the two sides 10—10 contact the bottom edges of fire pan 6. When grill 8 is slipped into position in side wall angles 17—17 the assembly is complete.

Assembled as shown in FIGURE 1, convertible tray 7 forms a baking oven and, as noted, uses the bottom of fire pan 6 as the top of the oven. Should the radiant heat from the bottom of fire pan 6 become too intense, the oven temperature may be lowered by opening one or both of the moveable sides 10—10 more or less to obtain the temperature desired.

For use as a warming oven convertible tray 7 may be left in the position shown in FIGURE 1 and its temperature controlled by manipulating its two moveable sides. It may, if desired, be lowered to side support channels 20—20 where the temperature will be considerably lower.

For use as a roasting and/or smoking oven, convertible tray 7 may be placed in a position immediately above the grill as illustrated in FIGURE 9. Here it is noted that the lower edge of hinged side 10 of convertible tray 7 when in the fully closed position, is slightly above grill 8. Back side 10, not shown, is in a similar position. To avoid overheating of the food being prepared, sides 10—10 of convertible tray 7 may be opened more or less as desired.

There are many ways in which the present improved barbecue may be manipulated to provide flexibility in the preparation of food. It is noted that there are four pairs of supporting channels in the side walls and only three working parts to occupy them. Thus, one pair of support channels is always out of use, and a second pair may not always be in use. For example, if only the grilling of meat is the objective, fire pan channels 22—22 may be placed in side support angles 20—20, which places the fire pan in the bottom most position. Grill 8 may then be placed in angle 17—17, 18—18, 19—19 depending upon the rate at which the meat is to be grilled. When the grill is in either of these positions, the side walls serve as wind breaks. Should a very high heat be required, such as is used in the rapid searing of meat, rapid heating of water, or in the preparation of toast, grill 8 may be placed directly upon fire pan 6 where the heat is very intense.

In fair weather convertible tray 7 may be used as a warming plate, or in inclement weather it may be used as a rain shield. To accomplish this the tray 7 may be placed on any pair of idle side support angles which are above the fire pan and grill. By opening sides 10—10 of convertible tray to the horizontal position or fixing them in a slightly downwardly inclined position, the tray becomes an effective rain shield as well as an additional wind break.

By referring again to FIGURE 1, it will be noted that the three working parts of the apparatus when in use, may be moved backward to contact the back panel of the carrying case. When in this position the three parts will overhang their support channels to a small extent, but this in no manner interferes with the cooking operation.

It should be noted that, although I have shown four pairs of side support angles in my barbecue, more than four pairs could be used without in any way departing from the spirit of the invention.

Having thus described my invention, what I claim as new is:

1. In a multi-purpose, portable barbecue, the combination comprising a metal carrying case having two slots cut transversely into its top section, said carrying case having a depth sufficient to enclose three detached functional parts comprising a shallow metal fire pan with handle, a grill, and a convertible tray, the back panel of said carrying case when open and in the erected condition forming the back wall section of the apparatus, and the two hinged doors forming opposed side wall sections, all wall sections being elevated from the ground level by short legs, said back wall section comprising a sheet of metal welded to the back edges of a metal forming strap, a portion of bottom edge being cut out and inwardly turned to form a flange of approximately the same width as metal forming strap, the remaining portions of back wall extending to the ground level to form part of back legs, the front section of back legs being formed by extensions of metal forming strap, said wall sections being attached to front edge of metal forming strap by full hinges extending the full width of wall sections, said wall sections each having four opposed supporting angles welded horizontally to their inside surface, and spaced evenly from top to bottom, the bottom most and top most angles being respectively raised slightly and lowered slightly from the edges of side walls, all supporting angles being shorter in lengths than side walls, said side walls having metal reinforcing straps welded to their forward outside surfaces and extending below bottom edges of side wall to form front legs of the apparatus.

2. In a multi-purpose portable barbecue as in claim 1, a flat metal tray having open ends and hinged sides, said sides extending full length of tray, and downwardly turned flanges, for interlocking with side supporting angles, said tray when placed in position either directly below or directly above fire pan, is capable of forming respectively a baking or warming oven or a roasting and/or a smoking oven.

3. In a multi-purpose, portable barbecue as in claim 1, wherein the shallow metal fire pan with handle has inverted U-shaped side support channels designed to slide into and interlock with any desired set of side wall supporting angles, and said flat sheet metal tray has two hinged sides extending full length of tray, the ends of said tray have downwardly turned edges designed to slide into and interlock with any desired pair of side wall supporting angles.

4. In a multi-purpose portable barbecue as in claim 1, a flat metal tray having open ends and hinged sides, said sides extending the full length of tray, and downwardly turned flanges for interlocking with any desired pair of side wall supporting angles, whereby said tray, when placed in a position above grill and fire pan, is capable of forming a rain shield or a warming plate.

References Cited

UNITED STATES PATENTS

| 1,327,115 | 1/1920 | Robinson | 126—9 |
| 2,659,360 | 11/1953 | Bitney. | |
| 3,308,804 | 3/1967 | Euliss | 126—25 |
| 3,421,493 | 1/1969 | Miller | 126—25 |

CHARLES, J. MYHRE, Primary Examiner

U.S. Cl. X.R.

126—25